United States Patent
Bauch et al.

(10) Patent No.: US 10,934,372 B2
(45) Date of Patent: Mar. 2, 2021

(54) OLEFIN POLYMERIZATION PROCESSES

(71) Applicant: ExxonMobil Chemical Patents Inc., Baytown, TX (US)

(72) Inventors: Christopher G. Bauch, Seabrook, TX (US); Blu E. Englehorn, Houston, TX (US); Kevin W. Lawson, Houston, TX (US); Todd S. Edwards, League City, TX (US); Keith W. Trapp, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 172 days.

(21) Appl. No.: 16/315,830

(22) PCT Filed: Jun. 22, 2017

(86) PCT No.: PCT/US2017/038791
§ 371 (c)(1),
(2) Date: Jan. 7, 2019

(87) PCT Pub. No.: WO2018/038796
PCT Pub. Date: Mar. 1, 2018

(65) Prior Publication Data
US 2019/0144573 A1    May 16, 2019

Related U.S. Application Data

(60) Provisional application No. 62/378,361, filed on Aug. 23, 2016.

(30) Foreign Application Priority Data

Oct. 3, 2016    (EP) .................... 16192004

(51) Int. Cl.
*C08F 10/06*    (2006.01)
*B01D 53/46*    (2006.01)
*C08F 2/12*    (2006.01)
*C08F 2/38*    (2006.01)
*C08F 4/642*   (2006.01)

(52) U.S. Cl.
CPC .............. *C08F 10/06* (2013.01); *B01D 53/46* (2013.01); *C08F 4/642* (2013.01); *C08F 2410/01* (2013.01); *C08F 2500/05* (2013.01); *C08F 2500/12* (2013.01)

(58) Field of Classification Search
USPC .................................................. 526/65, 68
See application file for complete search history.

(56) References Cited

U.S. PATENT DOCUMENTS

| | | | |
|---|---|---|---|
| 4,851,488 A | 7/1989 | Burstain | |
| 4,980,421 A | 12/1990 | Teramoto et al. | |
| 5,194,529 A * | 3/1993 | McCullough, Jr. | C08F 10/00 526/78 |
| 7,396,892 B2 * | 7/2008 | McGrath | C08F 6/003 526/348 |
| 7,897,705 B2 | 3/2011 | Aso et al. | |
| 9,045,569 B2 | 6/2015 | Jensen et al. | |

FOREIGN PATENT DOCUMENTS

| | | |
|---|---|---|
| EP | 0905151 A | 3/1999 |
| EP | 1041090 A | 10/2000 |
| JP | 08151408 A | 6/1996 |
| WO | 2013/154907 A | 10/2013 |

* cited by examiner

*Primary Examiner* — Fred M Teskin

(57) ABSTRACT

A process for reducing the level of hydrogen in certain polymerization effluent and recycle streams containing unreacted propylene monomers and hydrogen by contacting the streams with a hydrogenation catalyst so as to convert at least part of the propylene to the corresponding alkane. The process is particularly applicable to the effluent from a slurry polymerization reactor which has been used to produce a polypropylene homopolymer or copolymer having a first molecular weight and at least part of the effluent is to be supplied to a slurry polymerization reactor to produce a polypropylene homopolymer or copolymer having a second, higher molecular weight.

18 Claims, 2 Drawing Sheets

OLEFIN POLYMERIZATION PROCESSES

CROSS-REFERENCE OF RELATED APPLICATIONS

This application is a National Phase Application claiming priority to PCT Application Serial No. PCT/US2017/038791 filed Jun. 22, 2017, which claims priority to and the benefit of U.S. Ser. No. 62/378,361, filed Aug. 23, 2016 and EP 16192004.6, filed Oct. 3, 2016 and are incorporated by reference in their entirety.

FIELD OF THE INVENTION

This invention relates to olefin polymerization processes and, in particular, to olefin polymerization processes where hydrogen is used to regulate the molecular weight of the resultant polymer.

BACKGROUND OF THE INVENTION

In olefin polymerization processes, one mechanism for controlling the polymer molecular weight is to add a chain terminating agent to the process. As the concentration of the chain terminating agent is increased, the likelihood of terminating a growing polyolefin chain is also increased, so the average molecular weight of the bulk polymer tends to decrease. The chain terminating agent is usually hydrogen ($H_2$).

However, in a typical commercial polymerization plant several circumstances may arise where high hydrogen content in an effluent or recycle stream may not be conducive to producing the desired polymer in a reactor to which the effluent or recycle stream is fed. For example, where a polymer with a wide molecular weight distribution is desired, it is common to use two or more reactors operating at different conditions including different hydrogen concentrations. Thus, a first reactor may be producing a portion of the final product with very high molecular weight while a second reactor is producing very low molecular weight polymer with very high hydrogen levels. In such a case, any recycle stream from the second reactor will have too much hydrogen to be fed back to the first reactor without some intervention to remove hydrogen. Similarly, where the first reactor is being operated to produce low molecular weight polymer, the hydrogen level in the effluent from the first reactor will have to be reduced if the second reactor is to produce high molecular weight polymer. The same problem is encountered in other polymerization reactor systems when, for example, it is desired to transition toward the manufacture of a very high molecular weight product and the prior product required a high hydrogen content that must be reduced quickly to avoid production of excess off-specification polymer product.

In most commercial polymerization plants, purging of the hydrogen in recycle and effluent streams must be accomplished by venting a stream high in hydrogen content to a flare, fuel line, or other appropriate waste control device. The purged stream may consist of as little as 2 mol %, up to as high as 15 mol % or even 20 mol % hydrogen, while the remainder of the stream is primarily monomer which could otherwise be recycled back to the process. The purge stream rate is typically several hundred pounds per hour, and in many cases up to 500 lb/hr or even 750 lb/hr. In cases where very high molecular weight is required in a reactor receiving the recycled monomer stream or where rapid transitions are sought, the purge rate of the stream may be as high as 1000-1500 lb/hr. Removing hydrogen through typical methods, such as venting, can lead to costly loss of monomer and/or can extend transition times thereby generating significant amounts of off-spec polymer product.

There is therefore a need for an improved process for reducing hydrogen levels in effluent and recycle streams of polymerization plants.

Related publications include U.S. Pat. Nos. 9,045,569; 7,897,705; 4,980,421; 4,851,488; US 2013/0289277A1, US 2010/036070, EP 0 905 151 A1, EP 1 041 090 A1, WO 2013/154907, and JP 08151408.

SUMMARY OF THE INVENTION

Disclosed herein is a process for producing an olefin polymer, the process comprising (or consisting essentially of, or consisting of):

(a) contacting a feed comprising at least one olefin monomer and hydrogen with a polymerization catalyst in a first polymerization reactor under conditions effective to polymerize at least part of the at least one monomer and produce a first effluent containing an olefin polymer having a first molecular weight, unreacted monomer and hydrogen;

(b) contacting at least part of the first effluent with a hydrogenation catalyst under conditions effective to hydrogenate at least part of the unreacted monomer and produce a second effluent comprising a lower level of hydrogen than the first effluent; and (c) contacting at least part of the second effluent and at least one olefin monomer with a polymerization catalyst in a second polymerization reactor fluidly connected in series to the first polymerization reactor to produce a third effluent containing an olefin polymer having a second molecular weight higher than the first molecular weight.

Also, disclosed herein is a process for producing an olefin polymer, the process comprising (or consisting essentially of, or consisting of):

(a) contacting a feed comprising at least one olefin monomer with a polymerization catalyst in a first polymerization reactor under conditions effective to polymerize at least part of the at least one monomer and produce a first effluent containing an olefin polymer having a first molecular weight and unreacted monomer;

(b) contacting at least part of the first effluent, at least one olefin monomer and hydrogen with a polymerization catalyst in a second polymerization reactor fluidly connected in series to the first reactor to produce a second effluent containing an olefin polymer having a second molecular weight lower than the first molecular weight, unreacted monomer and hydrogen;

(c) contacting at least part of the second effluent with a hydrogenation catalyst under conditions effective to hydrogenate at least part of the unreacted monomer and produce a third effluent comprising a lower level of hydrogen than the second effluent; and (d) recycling at least part of the third effluent to the contacting (b).

According to yet a further aspect, there is disclosed a process for producing an olefin polymer, the process comprising (or consisting essentially of, or consisting of):

(a) contacting a first feed comprising at least one olefin monomer and hydrogen with a polymerization catalyst in a polymerization reactor under conditions effective to polymerize at least part of the at least one monomer and produce a first effluent containing an olefin polymer having a first molecular weight, unreacted monomer and hydrogen;

(b) contacting at least part of the first effluent with a hydrogenation catalyst under conditions effective to hydrogenate at least part of the unreacted monomer and produce a second effluent comprising a lower level of hydrogen than the first effluent;

(c) recycling at least part of the second effluent to the polymerization reactor; and (d) contacting the recycled second effluent and a second feed comprising at least one olefin monomer with a polymerization catalyst in the polymerization reactor under conditions effective to polymerize at least part of the at least one monomer and the recycled monomer to produce a third effluent containing an olefin polymer having a second molecular weight higher than the first molecular weight.

DETAILED DESCRIPTION OF THE EMBODIMENTS

Figure 1:
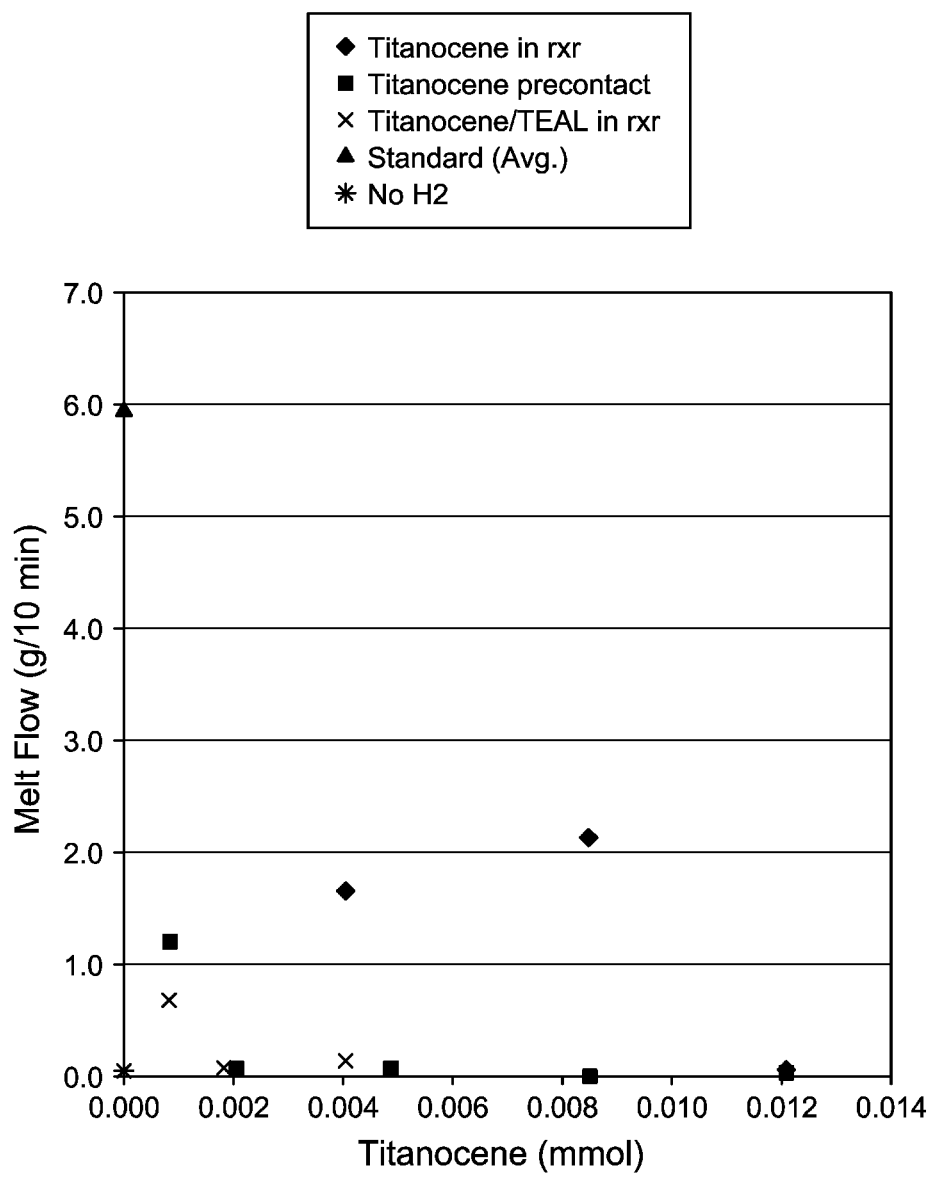
FIG. 1 is a graph showing the effect of titanocene concentration on polymer melt flow rate (MFR) in the polymerization process of Example 1.

The process described herein includes the addition of a hydrogenation catalyst to certain polymerization effluent streams containing unreacted olefin monomer and hydrogen so as to permit rapid reduction in the hydrogen level of the effluent stream before part or all of the effluent stream is supplied to a polymerization reactor where low hydrogen levels are required, for example to produce a high molecular weight polymer. In this way, the need for venting of the effluent stream to accomplish the desired hydrogen level reduction can be obviated or reduced and the associated loss of monomer can be minimized.

As used herein, a "reactor" is any type of vessel or containment device in any configuration of one or more reactors, and/or one or more reaction zones, wherein a similar polymer is produced; however, two or more reactors that are fluidly connected with one another may each produce a different polymer.

As used herein, the term "hydrogenation catalyst" means any chemical composition that is active to promote the reaction of an olefinic monomer with hydrogen in such a way to either transform it to another substance (e.g., combine with an alkene to form an alkane), or bind it and reduce or eliminate its further reactivity. Desirably, the hydrogenation catalyst is selected such that it is substantially inactive for the promotion of polymerization of olefinic monomers. Metals, supported or not, such as palladium and/or platinum can be suitable hydrogenation catalysts. Some hydrogenation catalysts require an "activator" such as an aluminum alkyl compound or blend of such compounds.

Preferably, the hydrogenation catalyst comprises a titanocene catalyst precursor (or referred to herein as a "titanocene") as used in combination with an aluminum alkyl compound. Preferably, the titanocene catalyst precursor is selected from $C_2$ and $C_s$-symmetric titanocene cations comprising any two ligands selected from cyclopentadienyl ligands and ligands isolobal to cyclopentadienyl ("Cp"), and anions selected from halogen, alkyl, and alkoxy groups. Preferably, the titanocene catalyst precursor is $C_2$ symmetric, such as a bis-cyclopentadienyl titanium dihalide or dialkyl, or bis-indenyl titanium dihalide or dialkyl. Suitable aluminum alkyls include those having the general formula $AlR_3$, where R is a C1 to C12 alkyl, more preferably a C1 to C8 alkyl, and most preferably a C1 to C5 alkyl, preferably triethylaluminum. The molar ratio of aluminum alkyl to titanocene can vary widely, but generally is at least 1 to 1, such as from 1 to 5. The titanocene is reduced from Ti (IV) to Ti (III) by complexing with the aluminum alkyl compound deactivating the titanocene for polymerization, but activating it for hydrogenation. A representative reaction is:

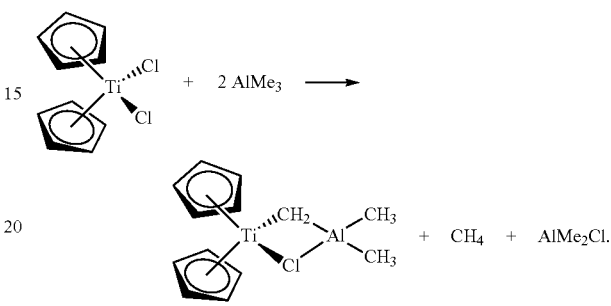

The titanocene and aluminum alkyl can be combined simultaneously or separately in time and space. For example, titanocene may be introduced as a complex in solution with an aluminum alkyl and a solvent, for example n-hexane, to a polymerization effluent stream. The feed rate of titanocene complex solution is controlled in order to achieve the required degree removal of hydrogen in the stream prior to the recovery and/or recycle of the monomer back to a polymerization reactor feed. Alternatively or additionally, titanocene may be introduced to the effluent stream or upstream as an intermittent 'shot' of un-complexed titanocene in solid form or slurry via an appropriate feed system. This solid/slurry stream is then swept into the targeted location where it can be complexed with an alkyl already in the effluent and/or additional alkyl may be added.

In a first embodiment, the present process comprises (or consists essentially of, or consists of) adding a hydrogenation catalyst to a polymerization effluent stream from a first polymerization reactor which is operated to produce an olefin polymer having a first molecular weight and which is fluidly connected to, and arranged in series with, a second polymerization reactor which is operated to produce an olefin polymer having a second molecular weight higher than the first molecular weight. The effluent stream from the first polymerization reactor contains hydrogen, whereas a lower or zero hydrogen level is required to produce the higher molecular weight polymer in the second polymerization reactor.

In particular, in the process of the first embodiment, a feed comprising at least one olefin monomer and hydrogen is contacted with a polymerization catalyst in the first polymerization reactor under conditions effective to polymerize at least part of the at least one monomer and produce a first effluent containing the olefin polymer having a first molecular weight, unreacted monomer and residual hydrogen. At least part of, and in most embodiments, all of the first effluent is then contacted with the hydrogenation catalyst under conditions effective to hydrogenate at least part of the unreacted monomer and produce a second effluent comprising a lower level of hydrogen than the first effluent. At least part of the second effluent and at least one olefin monomer is then contacted with a polymerization catalyst in the second polymerization reactor to produce a third effluent containing the olefin polymer having a second molecular weight higher than the first molecular weight. Generally, there is no separation of the olefin polymer from the first effluent or the second effluent and so the third effluent comprises a polymer product comprising the olefin polymer having a first molecular weight and the olefin polymer having a second molecular weight. The polymer product can then be recovered from the third effluent.

In any embodiment, there may already be aluminum alkyl in an effluent such as the first and/or second effluent, thus only the hydrogenation catalyst need be added or combined with such effluent. The aluminum alkyl may have been in the first polymerization reactor as a scavenger, or as a co-catalyst for the polymerization catalyst, or unreacted aluminum alkyl added for removing hydrogen from a previous step.

The olefinic component of the feed to the first polymerization reactor may consist of a single olefin monomer, such as ethylene or propylene, such that the polymer produced is a homopolymer or may comprise a plurality of different olefin monomers, such as ethylene and/or propylene and one or more α-olefins, such as 1-butene, 1-hexene and/or 1-octene, such that the polymer produced is a copolymer. Similarly, the at least one olefin monomer supplied to the second polymerization reactor may consist of a single olefin monomer, such as ethylene or propylene, or may comprise a plurality of different olefin monomers, such as ethylene and/or propylene and one or more α-olefins, such as 1-butene, 1-hexene and/or 1-octene. The olefinic component of the feed to the first polymerization reactor may be the different from the at least one olefin monomer supplied to the second polymerization reactor, but more preferably the olefinic components are the same so that a polymer product having a bimodal molecular weight distribution can be produced by the first and second polymerization reactors.

Most preferably, the olefinic components comprise at least 50, or 60, or 70, or 80 wt % propylene by weight of the monomers present in the stream and/or reactor, and the polymer produced is a polypropylene homopolymer or copolymer comprising within the range from 0.1, or 4 wt % to 6, or 12, or 18, or 20, or 26, or 30 wt % α-olefins units derived from ethylene, 1-butene, 1-hexene and/or 1-octene. Polypropylene copolymers can include so called "impact copolymers" which are a heterogeneous blend of polypropylene homopolymer and ethylene-propylene copolymers comprising up to 40, or 50 wt % ethylene content.

The amount of hydrogen present in the feed to the first polymerization reactor will depend on the nature and molecular weight of the olefin polymer to be produced in the first reactor. Thus, in a typical commercial example, the amount of hydrogen in the feed to the first polymerization reactor may be within a range from 100 or 200 or 400 mppm to 1,000 or 5,000 or 10,000 or 25,000 or 50,000 mppm (mole parts per million, or ppm on a molar basis) relative to the total amount of monomer in the feed. Similarly, the amount of hydrogen desired in the second effluent will depend on the nature and molecular weight of the olefin polymer to be produced in the second reactor. For example, the amount of hydrogen in the second effluent may vary from 0 or 10 or 20 or 50 or 100 mppm to 200 or 300 or 400 or 500 or 1,000 or 4,000 or 8,000 or 10,000 mppm or even higher relative to the total monomer in the second reactor. Thus, the second effluent may contain at least 50 wt % less, such at least 90 wt % less, even 99 wt % less hydrogen than the first effluent stream.

The hydrogenation catalyst can be added at any convenient location in the polymerization reactor system, such as to a connecting line between the first and second polymerization reactors. Preferably, the hydrogenation catalyst is added to the first effluent before the latter enters the second polymerization reactor. The amount of hydrogenation catalyst added will depend on the hydrogen reduction required, the residence time and the activity of the hydrogenation catalyst. For example, in the case of a catalyst comprising titanocene and aluminum alkyl, the hydrogenation activity of the catalyst is on the order of 2000 mole $H_2$/mole Ti/minute.

The process of the first embodiment is suitable for use in any type of polymerization reactor system that requires the removal of hydrogen between two series-connected polymerization reactors. Thus, the process can be conducted with a system having three or more polymerization reactors, provided the system includes at least two reactors which are in fluid connection and where the hydrogen level in a first upstream reactor is more than the hydrogen level required in a second down stream reactor. Similarly, the process can be employed with all types of polymerization reactors, but is particularly intended for use in reactors operating in the slurry phase, such as loop reactors or stirred tank reactors. In this regard, a non-limiting example of the present process comprises at least two slurry reactors fluidly connected and arranged in series, meaning that fluids and gases are allowed to flow from one reactor to another to carry polymer, monomer, catalyst and/or other gases such as hydrogen in such a manner that polymerization can occur in, for example, the first reactor then can continue in, for example, the second reactor.

In a second embodiment, the present process comprises (or consists essentially of, or consists of) adding a hydrogenation catalyst to a combined recycle stream from first and second polymerization reactors which are fluidly connected to and arranged in series, where the first reactor is being operated to produce a portion of the final polymer product with very high molecular weight and the second reactor is producing very low molecular weight polymer with very high residual hydrogen content. In this case, without the addition of the hydrogenation catalyst, the combined recycle stream would be too high in hydrogen to be fed to the first reactor without significant venting and loss of monomer.

In particular, in the process of the second embodiment, a feed comprising at least one olefin monomer is contacted with a polymerization catalyst in the first polymerization reactor under conditions effective to polymerize at least part of the at least one monomer and produce a first effluent containing an olefin polymer having a first molecular weight and unreacted monomer. At least part of, and in most embodiments, all of the first effluent, is then combined with at least one olefin monomer and hydrogen and contacted with a polymerization catalyst in the second polymerization reactor to produce a second effluent containing an olefin polymer having a second molecular weight lower than the first molecular weight, unreacted monomer and hydrogen. At least part of the second effluent is then contacted with a hydrogenation catalyst under conditions effective to hydrogenate at least part of the unreacted monomer and produce a third effluent which comprises a lower level of hydrogen than the second effluent and which, at least in part, is subsequently recycled to the first polymerization reactor. In most embodiments, at least part of the polymer product is recovered from the second effluent or the third effluent prior to the recycling of the third effluent to the first polymerization reactor.

As in the first embodiment, the olefinic component of the feed to the first polymerization reactor in the second embodiment may consist of a single olefin monomer, such as ethylene or propylene, such that the polymer produced is a homopolymer or may comprise a plurality of different olefin monomers, such as ethylene and/or propylene and one or more α-olefins, such as 1-butene, 1-hexene and/or 1-octene, such that the polymer produced is a copolymer. Similarly, the at least one olefin monomer supplied to the second polymerization reactor may consist of a single olefin monomer, such as ethylene or propylene, or may comprise a plurality of different olefin monomers, such as ethylene and/or propylene and one or more α-olefins, such as 1-butene, 1-hexene and/or 1-octene. The olefinic component of the feed to the first polymerization reactor may be the different from the at least one olefin monomer supplied to the second polymerization reactor, but more preferably the olefinic components are the same so that a polymer product having a bimodal molecular weight distribution can be produced by the first and second polymerization reactors.

The amount of hydrogen, if any, present in the feed to the first polymerization reactor in the second embodiment will depend on the nature and molecular weight of the olefin polymer to be produced in the first reactor. Thus, in a typical commercial example, the amount of hydrogen in the feed to the first polymerization reactor may vary from 0 or 10 or 20 or 50 or 100 mppm to 200 or 300 or 400 or 500 or 1,000 or 4,000 or 8,000 or 10,000 mppm or even higher relative to the total monomer in the first reactor. Similarly, the amount of hydrogen added to the first effluent will depend on the nature and molecular weight of the olefin polymer to be produced in the second reactor and may, for example, vary from 100 or 200 or 400 mppm to 1,000 or 5,000 or 10,000 or 25,000 or 50,000 mppm relative to the total amount of monomer added to the second reactor. Before being recycled to first polymerization reactor, hydrogen reduction of the second effluent of at least 50 wt %, such at least 90 wt %, or even 99 wt % may be required. This is achieved by addition of the hydrogenation catalyst, either alone or in combination with venting of the second effluent.

The process of the second embodiment can be employed with all types of polymerization reactors including stirred gas phase reactors and fluidized bed reactors, singly or in series, but is particularly intended for use in reactors operating in the slurry phase, such as loop reactors or stirred tank reactors.

In a third embodiment, the present process comprises (or consists essentially of, or consists of) adding a hydrogenation catalyst to an effluent stream from a polymerization reactor, where the effluent stream contains unreacted olefin monomer and hydrogen and it is required to reduce the level of hydrogen in the effluent steam before the unreacted monomer is recycled to the same polymerization reactor. Such a situation may occur where a process transition is occurring toward producing a very high molecular weight product in a polymerization reactor when the prior product from the same reactor required a high hydrogen content that must be reduced quickly to avoid production of excess off-specification polymer product.

In particular, in the process of the third embodiment, a first feed comprising at least one olefin monomer and hydrogen is contacted with a polymerization catalyst in a polymerization reactor under conditions effective to polymerize at least part of the at least one monomer and produce a first effluent containing an olefin polymer having a first molecular weight, unreacted monomer and residual hydrogen. At least part of the first effluent is then contacted with a hydrogenation catalyst under conditions effective to hydrogenate at least part of the unreacted monomer and produce a second effluent comprising a lower level of hydrogen than the first effluent. After discontinuing the supply of the first feed, at least part of the second effluent can then be recycled to the polymerization reactor together with additional monomer. Operation of the polymerization reactor can then be switched to the production of olefin polymer having a second molecular weight higher than the first molecular weight. In most embodiments, low molecular weight olefin polymer is recovered from the first effluent or the second effluent prior to the recycling of the second effluent to the polymerization reactor.

As in the previous embodiments, the olefinic component of the feed to the polymerization reactor employed in the third embodiment may consist of a single olefin monomer, such as ethylene or propylene, or may comprise a plurality of different olefin monomers, such as ethylene and/or propylene and one or more α-olefins, such as 1-butene, 1-hexene and/or 1-octene. Also, although the process of the third embodiment can be employed with all types of polymerization reactors, it is particularly intended for use in reactors operating in the slurry phase, such as loop reactors or stirred tank reactors.

In all of the above embodiments, control of the propylene or ethylene hydrogenation reaction using hydrogenation catalysts in a polymerization reactor incorporates any one or more of three aspects: (1) full dispersion of the material into the reaction medium; (2) residence time to provide for completion of the reaction; and (3) flow control of a very small, yet specific quantity of hydrogenation catalyst to achieve the necessary molar ratio of hydrogenation catalyst to hydrogen in the system. The catalyst in one aspect of this invention is introduced to the reactor or feed stream as a liquid solution in which hydrogenation catalyst is activated with an aluminum alkyl (in the case of titanocene) and then diluted in a hydrocarbon solvent, for example n-hexane.

As an alternative, a high velocity stream of paraffin, olefin, or oil alone can be used to carry the solid hydrogenation catalyst as a slurry to the reaction injection point and remaining aluminum alkyl from the reaction process then acts as the activating agent for the titanocene, starting the hydrogenation reaction upon injection. In a reaction system where sufficient excess aluminum alkyl is present and residence time is available to activate the titanocene and drive the hydrogenation reaction to the extent needed, this is a preferred method due to reduced handling and raw material costs associated with the activator (if needed) and any solvents required in an alternate system as discussed previously.

Any type of polymerization catalyst can be used to effect the formation of polyolefin in the process of the invention. Useful catalysts include metallocenes and other single site catalyst and their associated activators, and Ziegler-Natta catalysts and their associated activator. In either case, the aluminum alkyls described herein in relation to the hydrogenation catalyst may also be used as the activator for the polymerization catalyst. In any embodiment, the aluminum alkyl that is used in the polymerization of α-olefins to form polyolefins may also be the aluminum alkyl that activates the titanocene hydrogenation catalyst, thus, in those cases additional aluminum alkyl may not need to be added with the titanocene.

In any embodiment, a step of venting an effluent stream, such as by a low pressure venting system, to remove hydrogen is absent.

When numerical lower limits and numerical upper limits are listed herein, ranges from any lower limit to any upper limit are contemplated. The invention is more particularly described in the following non-limiting Example and the accompanying drawings.

EXAMPLES

Laboratory polymerizations were performed to determine the effect of adding titanocene and the relative effectiveness of different addition methods.

The general polymerization procedure is as follows: Into a nitrogen-purged 2 liter autoclave was added 1 mL 1.0 M triethylaluminum in hexane and 1 mL of 0.1 M external donor solution in hexane. Hydrogen (83 mmol, or other amount as specified) was then fed into the reactor. A mineral oil slurry (or other medium) containing 7.5 mg of Ziegler-Natta catalyst, 1 mL 1.0 M triethylaluminum in hexane and 1 mL of 0.1 M external donor solution in hexane was flushed into the reactor with 1250 mL liquid propylene. The reactor was heated to 70° C. and stirred for 60 minutes. After venting the propylene, the polymer was dried in vacuo at room temperature.

The first set of tests used a mineral oil slurry of solid $Cp_2TiCl_2$ which was added to the reactor either in the pre-contact bomb (with catalyst, TEAL, and secondary electron donor) or in the reactor prior to catalyst introduction. The addition of the solid titanocene demonstrated the in-situ preparation of the hydrogenation catalyst by reacting it with the TEAL present in the polymerization reactor.

Figure 2:
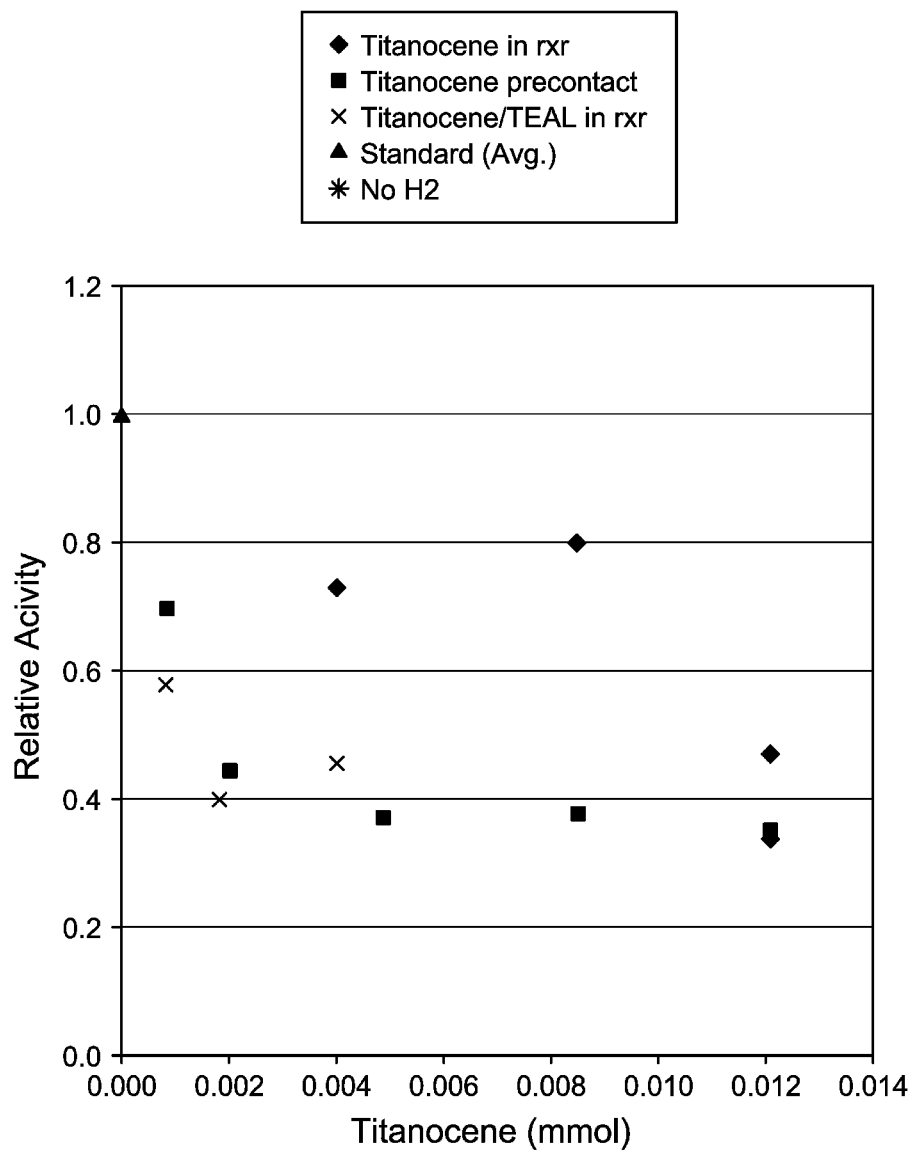
FIG. 2 is a graph showing the effect of titanocene concentration on polymerization catalyst activity in the polymerization process of Example 1.

The second method of addition involved prior preparation of the hydrogenation catalyst by mixing $Cp_2TiCl_2$ and TEAL (1:4 molar ratio) in hexane to make a 0.004 M solution. Standard propylene polymerizations were performed using a Mg/Ti-based Ziegler-Natta catalyst with varying amounts of titanocene. The results are shown in FIGS. 1 and 2.

In the Figures, the following labels in the key have the following meaning: "Titanocene in rxr" refers to solid titanocene added to reactor after the addition of TEAL and donor; "Titanocene in precontact" refers to solid titanocene added to Ziegler-Natta catalyst, TEAL, donor slurry; and "Titanocene/TEAL in rxr" refers to a solution of titanocene in a solvent with TEAL (1:4) added and donor.

The melt flow rate ("MFR") of linear polyolefins correlates well with its molecular weight (weight average and number average). Thus, as the MFR of a polymer increases, its molecular weight generally decreases. As shown in FIG. 1, the polymer MFR (ASTM D1238, 2.16 kg, and 230° C.) dropped from the standard value ("standard value" represents the production of propylene homopolymer which uses the same Ziegler-Natta catalyst and the electron donor cyclohexylmethyl dimethoxysilane and 83 mmol $H_2$) of 6 g/10 min to less than 0.1 g/10 min after the addition of 0.002 mmol of titanocene in the pre-contact bomb. This is comparable to the MFR achieved when no hydrogen was added to the reactor at all indicating that the hydrogen (83 mmol) is removed rapidly before a substantial amount of lower molecular weight polymers could be produced. When 0.0008 mmol of titanocene was used, the MFR was intermediate between that produced with no hydrogen and the standard. Addition of the titanium-aluminum complex was more effective at removing hydrogen as evidenced by the reduced MFR realized for the polymerization performed using 0.2 mg of titanocene equivalent. Addition of the titanocene to the reactor prior to the polymerization was not as efficacious as adding it to the pre-contact bomb. The polymerization activity followed a similar trend as the MFR due to the activity enhancement provided by hydrogen for propylene polymerization. When $1.8 \times 10^{-6}$ moles of titanocene was added, the activity decreased to an amount comparable to that achieved without hydrogen (FIG. 2). These results indicate that the only effect on catalyst performance is due to the removal of hydrogen and no other adverse interaction was encountered.

The phrase "consisting essentially of" means that there are no other steps or added components or compositions that effect a chemical reaction, but does not exclude steps or components that impact a physical change such as temperature, pressure, fluid velocity, etc.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the example and descriptions set forth herein, but rather that the claims be construed as encompassing all the features of patentable novelty which reside herein, including all features which would be treated as equivalents thereof by those skilled in the art to which this disclosure pertains.

The invention claimed is:

1. A process for producing a polypropylene homopolymer or copolymer, the process comprising:
   (a) contacting a feed comprising at least propylene monomer with a polymerization catalyst in a first polymerization reactor operating in the slurry phase under conditions effective to polymerize at least part of the at least one monomer and produce a first effluent containing polypropylene homopolymer or copolymer having a first molecular weight and unreacted monomer;
   (b) contacting at least part of the first effluent, at least propylene monomer and hydrogen with a polymerization catalyst in a second polymerization reactor operating in the slurry phase fluidly connected in series to the first polymerization reactor to produce a second effluent containing a polypropylene homopolymer or copolymer having a second molecular weight lower than the first molecular weight, unreacted monomer and hydrogen;
   (c) contacting at least part of a second effluent with a hydrogenation catalyst under conditions effective to hydrogenate at least part of the unreacted monomer and produce a third effluent comprising a lower level of hydrogen than the second effluent; and
   (d) recycling at least part of the third effluent to the contacting step (b).

2. The process of claim 1, wherein the hydrogenation catalyst comprises a titanocene and an aluminum alkyl.

3. The process of claim 2, further comprising combining the titanocene and aluminum alkyl with at least part of the second effluent.

4. The process of claim 2, further comprising separately adding the titanocene and aluminum alkyl to at least part of the second effluent.

5. The process of claim 1, wherein the second effluent also comprises an aluminum alkyl, wherein the hydrogenation catalyst comprises a titanocene, and the titanocene is added to at least part of the second effluent.

6. The process of claim 1, wherein the polymerization catalyst of steps (a) and (b) comprises a Ziegler-Natta catalyst.

7. The process of claim 1, wherein the monomers in the contacting step (a) is the same as the propylene in the contacting step (b) and the contacting step (b) produces a polypropylene homopolymer or copolymer having a bimodal molecular weight distribution.

8. The process of claim 1, further comprising:
 (e) recovering at least part of the polypropylene homopolymer or copolymer from the second effluent or the third effluent prior to the recycling step (d).

9. The process of claim 1, wherein a step of venting an effluent stream to remove hydrogen is absent.

10. A process for producing a polypropylene homopolymer or copolymer, the process comprising:
 (a) contacting a first feed comprising at least propylene and hydrogen with a polymerization catalyst in a polymerization reactor operating in the slurry phase under conditions effective to polymerize at least part of the at least propylene and produce a first effluent containing a polypropylene homopolymer or copolymer having a first molecular weight, unreacted monomer and hydrogen;
 (b) contacting at least part of the first effluent with a hydrogenation catalyst under conditions effective to hydrogenate at least part of the unreacted monomer and produce a second effluent comprising a lower level of hydrogen than the first effluent;
 (c) recycling at least part of the second effluent to the polymerization reactor operating in the slurry phase; and
 (d) contacting the recycled second effluent and a second feed comprising at least propylene with a polymerization catalyst in the polymerization reactor operating in the slurry phase under conditions effective to polymerize at least part of the propylene and the recycled monomer to produce a third effluent containing a polypropylene homopolymer or copolymer having a second molecular weight higher than the first molecular weight.

11. The process of claim 10, wherein the hydrogenation catalyst comprises a titanocene and an aluminum alkyl.

12. The process of claim 11, further comprising combining the titanocene and aluminum alkyl with at least part of the first effluent.

13. The process of claim 11, further comprising separately adding a titanocene and an aluminum alkyl to at least part of the second effluent.

14. The process of claim 10, wherein the first effluent also comprises an aluminum alkyl, wherein the hydrogenation catalyst comprises a titanocene, and the titanocene is added to at least part of the first effluent.

15. The process of claim 11, wherein the aluminum alkyl has the formula $AlR_3$, where R is a C1 to C12 alkyl.

16. The process of claim 10, wherein the polymerization catalyst comprises a Ziegler-Natta catalyst.

17. The process of claim 10, wherein a step of venting an effluent stream to remove hydrogen is absent.

18. The process of claim 10, further comprising:
 (e) recovering at least part of the polypropylene homopolymer or copolymer having a first molecular weight from the first effluent or the second effluent prior to the recycling step (c).

* * * * *